United States Patent [19]
Galantino et al.

[11] Patent Number: 4,749,841
[45] Date of Patent: Jun. 7, 1988

[54] PULSED ARC WELDING METHOD, APPARATUS AND SHIELDING GAS COMPOSITION

[75] Inventors: Carlo Galantino, Napa; Donald P. Viri; Michael D. Viri, both of Fairfield, all of Calif.

[73] Assignee: Viri Manufacturing, Inc., Suisun, Calif.

[21] Appl. No.: 9,818

[22] Filed: Feb. 2, 1987

[51] Int. Cl.⁴ .................................................. B23K 9/16
[52] U.S. Cl. ........................... 219/137 PS; 219/74; 239/400
[58] Field of Search .............. 219/74, 130.51, 137 PS; 239/104, 79, 400

[56] References Cited

U.S. PATENT DOCUMENTS

| 3,496,323 | 2/1970 | Lesnewich et al. | 219/74 |
| 4,273,988 | 6/1987 | Iceland | 219/137 PS |
| 4,645,903 | 2/1987 | De Vito et al. | 219/74 |

FOREIGN PATENT DOCUMENTS 2821875 11/1979 Fed. Rep. of Germany ...... 239/104
763052 12/1956 United Kingdom ................ 219/74

OTHER PUBLICATIONS

Airco Miniproportioner Demand Gas Mixing System Date: Jun. 1973; Airco Welding Products, Union New Jersey.

Primary Examiner—Clifford C. Shaw
Attorney, Agent, or Firm—Phillips, Moore Lempio & Finley

[57] ABSTRACT

Metal deposition rate is increased with reduced energy input in pulsed arc welding with a consumable electrode and a shielding gas mixture of argon, helium and carbon dioxide, the helium content being in the range from about 16% to about 25% and the carbon dioxide content being from about 1% to 4%. The component gases are stored in separate containers until the welding operation during which precisely metered flows of each are entrained by a metering valve and directed to the weld region. Consistently finished welds are produced, on stainless steel, low alloy steels and nickel based alloys as well as other weldable ferrous metals, including during out of position welding operations.

21 Claims, 2 Drawing Sheets

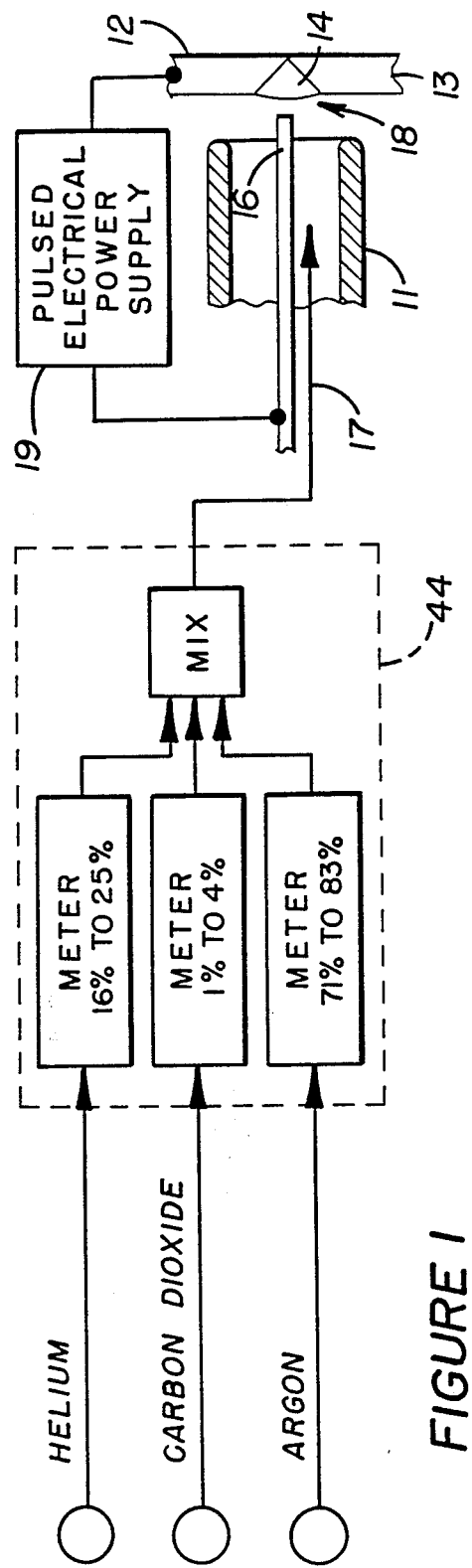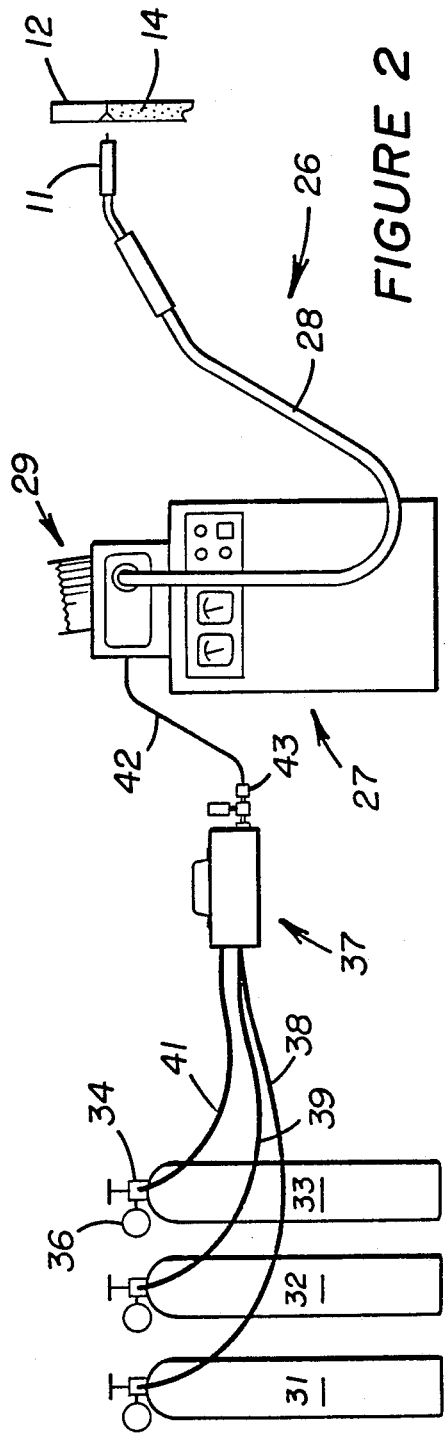

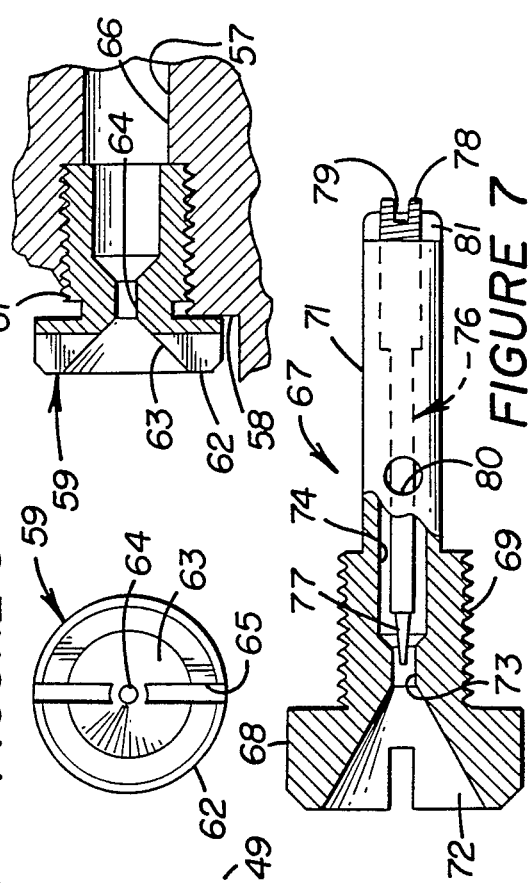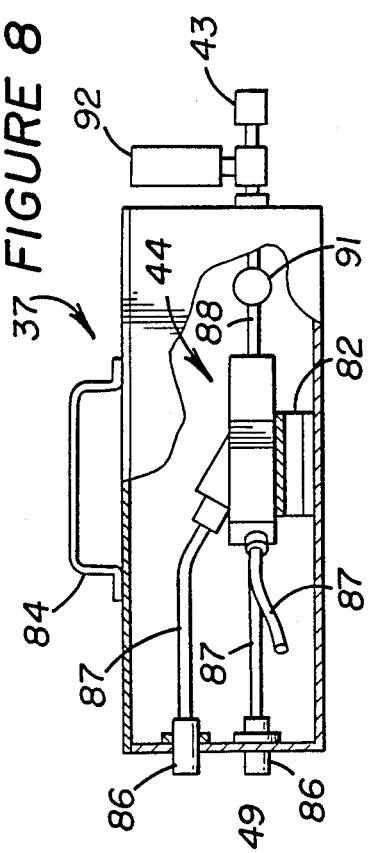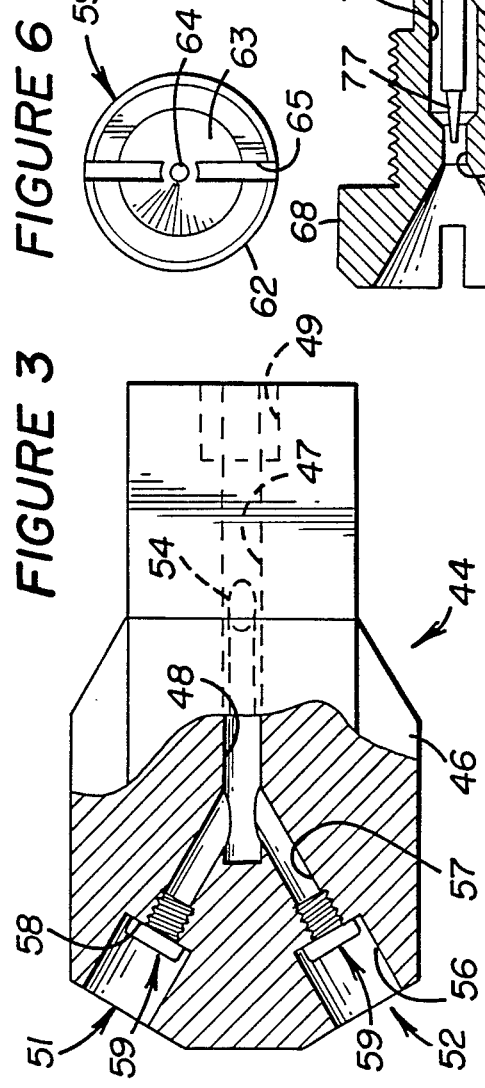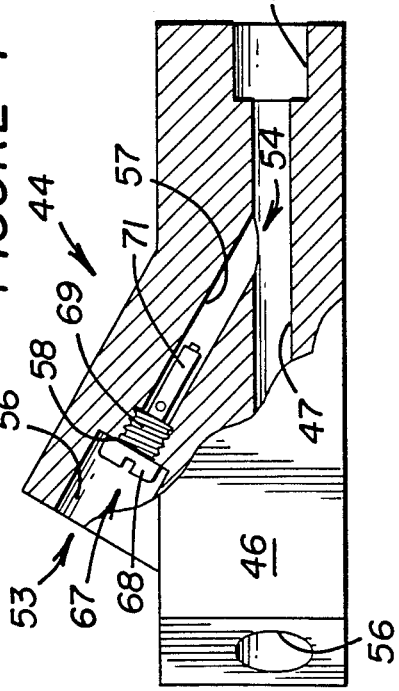

PULSED ARC WELDING METHOD, APPARATUS AND SHIELDING GAS COMPOSITION

TECHNICAL FIELD

This invention relates to the welding of metals and more particularly to electrical arc welding in which a pulsed arc is established between a consumable electrode and the workpiece and in which a shielding gas mixture is provided at the weld region.

BACKGROUND OF THE INVENTION

In the welding process commonly referred to as gas metal arc welding an electrical arc is established between a consumable metal electrode and the workpieces which are to be joined. The arc transfers molten metal from the electrodes to form the weld bead. Oxidation of the molten metal is reduced and the arc is stabilized by directing a flow of shielding gas to the weld region. The shielding gas is typically composed of one or more inert gases containing a small admixture of oxygen or carbon dioxide which creates a mildly oxidizing atmosphere that promotes fusion of the electrode metal with that of the workpieces.

It is known practice to cyclically pulse the arc current between a minimal value needed to maintain the arc and a maximum value which may be several hundred percent larger. Pulse frequency may range from several cycles per second up to several hundred cycles depending on conditions at the particular welding operation. This results in a transfer of molten electrode metal in the form of periodic large droplets rather than as a continuous spray which is more difficult to control and which is less suited to so called out of position welding where the weld bead must be formed with a vertical or inclined orientation.

Significant limitations and problems are encountered in the conventional practice of pulsed arc gas arc welding.

It would be advantageous if the energy input needed to produce a given length of weld bead were reduced and the rate of deposition of metal increased. Heat adversely affects the metallurgical properties of metals and a reduction of energy input would reduce the extent of heat damage. Faster metal deposition would increase productivity. It would also be advantageous if the process were less sensitive to the skills of the individual welders.

Welds produced by conventional pulsed arc gas metal arc welding typically require extensive mechanical reworking to eliminate defects and to improve appearance. Heavy oxidation may be present. Spattering, sagging, surface irregularities and non-uniform bead profiles are common occurrences. Fusion or penetration is sometimes poor and may necessitate rejection of a weld. Elimination or reduction of the need for reworking and a reduction of rejection rate would clearly be advantageous.

The above discussed problems are encountered in working with weldable ferrous metals in general but are particularly acute in the welding of certain specific metals or classes of metals. Stainless steels, low alloy steels and nickel based alloys are the more common examples. In addition to the problems discussed above, losses of specific components of such alloys occur when prior pulsed arc gas metal welding equipment and techniques are used. Such welding of stainless steel, for example, tends to deplete the chromium content of the metal which effect is believed to result from selective oxidation or evaporation of that particular component. The resulting weld bead may be subject to rusting and may be deficient in other desirable properties of stainless steel.

The present invention is directed to overcoming one or more of the problems discussed above.

SUMMARY OF THE INVENTION

In one aspect, the present invention provides a method for welding metal workpieces which includes the steps of establishing an electrical arc between the workpieces and a consumable electrode to transfer metal from the electrode to a weld at the workpieces, cyclically varying the intensity of the arc, and directing a shielding gas mixture to the region of the weld. The shielding gas mixture is prepared concurrently with the welding operation by intermixing carbon dioxide with argon and helium while the welding operation is in progress and a flow of the gas mixture is directed to the weld region. Further steps include metering the helium content of the flow to be within the range from about 14% to about 25% and metering the carbon dioxide content of the flow to be within the range from about 1% to about 4%.

In another aspect, the invention provides a shielding gas mixture for use in pulsed arc gas metal arc welding which is comprised of intermixed argon, helium and carbon dioxide, the mixture having helium content in the range from about 16% to about 25% and having a carbon dioxide content in the range from about 1% to about 4%.

In another aspect, the invention provides pulsed arc gas metal arc welding apparatus having a welding gun for supporting a consumable electrode in spaced apart relationship with a workpiece at which a weld is to be formed, means for establishing and maintaining a pulsed electrical arc between the electrode and the workpiece, and means for directing a shielding gas flow to the weld region, the valve also having a plurality of gas inlet passages each extending in angled relationship to the mixture flow passage and each of which connects with the mixture flow passage. The apparatus still further includes a plurality of flow metering flow constrictions each being disposed in a separate one of the inlet passages, a plurality of gas containers, and means for communicating each of the inlet passages of the valve with a separate one of the gas containers.

In still another aspect, the invention provides a mixing valve for supplying a shielding gas mixture to the weld region during arc welding operations. The valve includes a valve body having a gas mixture flow passage communicating with a gas mixture outlet, first and second gas inlet passages which are angled with respect to the mixture flow passage and which connect with the mixture flow passage at opposite sides of a predetermined portion of the passage, and a third gas inlet passage which is angled with respect to the gas mixture flow passage and which connects with the flow passage at a location between the outlet and the predetermined portion of the flow passage. The mixing valve further includes first, second and third flow constrictions in the first, second and third gas inlet passages respectively, and means for connecting each of the gas inlet passages to a separate gas source.

The novel shielding gas mixture of the invention realizes several pronounced improvements in pulsed arc gas metal arc welding if the proportioning of the component gases is precisely controlled. This is not reliably accomplished by storing a mixture of the component gases in a pressure cylinder in the conventional manner as stratification of the gases tends to occur. In one aspect of the present invention, components of the shielding gas mix are stored in separate cylinders or the like until an actual welding operation at which time precisely metered flows of the components are entrained with each other and the mixture is directed to the weld region. In other aspects, the invention provides a welding installation and a shielding gas mixing valve which reliably and consistently delivers an optimum proportioning of the components of the shielding gas. The invention substantially reduces energy input for a given length of weld bead and enables a higher metal deposition rate in pulsed arc gas metal arc welding. High quality welds are produced that require little or no mechanical reworking and heat damage to the workpieces is reduced. Significant component alloy loss from oxidation or evaporation is avoided in the welding of stainless steels, low alloy steels and nickel based alloys. These results are realized in out of position welding as well as in position operations.

BRIEF DESCRIPTION OF THE DRAWINGS

FIG. 1 is a process diagram illustrating steps in a pulsed arc gas metal arc welding method in accordance with a preferred embodiment of the invention.

FIG. 2 is an elevation view of a welding installation for practicing the method of FIG. 1.

FIG. 3 is a top view, partially in section, of a shielding gas mixing valve component of the apparatus of FIG. 2.

FIG. 4 is a side view, also partially in section, of the mixing valve of FIG. 3.

FIG. 5 is an axial section view of a gas metering jet component of the shielding gas mixing valve.

FIG. 6 is an end view of the gas metering jet of FIG. 5.

FIG. 7 is a side view, partially in section, of a gas metering needle valve component of the shielding gas mixing valve.

FIG. 8 is a broken out side view of a shielding gas mixing unit which includes the mixing valve of FIGS. 3 and 4.

DETAILED DESCRIPTION OF THE PREFERRED EMBODIMENTS

Referring initially to FIG. 1 of the drawings, a welding operation in accordance with the method of the present invention is initiated by bringing the tubular tip of a conventional welding gun 11 into proximity with abutted portions of two workpieces 12 and 13 which are to be joined by a weld bead 14. The end portion of a consumable wire electrode 16 extends along the axis of the welding gun 11 and projects a small distance outward from the tip of the gun towards the region of weld bead 14.

A flow 17 of shielding gas mixture is directed to the weld region 18, preferable through the welding gun 11, and an electrical power supply 19 is connected between the electrode 16 and workpieces 12 and 13 to establish an electrical arc discharge of sufficient intensity to melt the metal of workpieces 12 and 13 in the weld region and which also melts the tip of electrode 16 which may be formed of similar metal. The arc also deposits molten metal from the electrode 16 on the abutted portions of workpieces 12 and 13 to form the weld bead 14.

Arc current is cyclically pulsed between a minimum value slightly greater than that needed to maintain the arc and a maximum value which may range up to several hundred percent of the minimum value. Pulsing causes electrode metal to be transferred in the form of relatively large intermittent droplets rather than as a continuous spray which is less easy to control and less suitable for certain particular operations such as out of position welding. Although not limitative of the possible operating parameters, arc current may typically be in the range from about 40 amperes to about 350 amperes and the arc current may be pulsed at a rate of one pulse per second for each ampere of arc current.

Feeding of the electrode 16 wire along the axis of welding gun 11 during the welding operation maintains the desired spacing of the electrode tip from weld bead 14 as the tip is being consumed.

Further steps in the method of this example of the invention include preparing the shielding gas mixture for flow 17 concurrently with the welding operation by intermixing precisely controlled flows of carbon dioxide, argon and helium while the welding operation is in progress. Flows of each such gas are metered and then intermixed to provide a shielding gas mixture flow 17 at the welding gun 11 which has a volumetric helium content in the range from about 16% to about 25% and a volumetric carbon dioxide content from about 1% to about 4%. The metering and mixing operations may advantageously be performed with a specialized metering and mixing valve 44 which will hereinafter be described.

Referring now to FIG. 2, components of a welding installation 26 suitable for practicing the above described method may include a welding gun 11 of conventional design and a pulsed arc welding power supply and electrode wire feeding unit of the known construction. Such units 27 couple to the welding gun through a flexible hose 28 and have means 29 for continuously feeding the electrode wire 16 to welding gun 11 through the hose which also transmits the shielding gas mixture to the welding gun. Model PA-350 manufactured by Airco-Arc Products, Chicago, Ill. is one example of a suitable pulsed arc current supply and wire feeder unit 27 of this kind.

Pressurized helium, argon and carbon dioxide are stored in separate pressure cylinders 31, 32 and 33 respectively each of which has an outlet valve 34 and outlet flow pressure indicator gage 36.

A number of conventional gas mixing devices, such as mixing chambers, for example, have been found to be unsuitable for the present purposes. Intermixing of the relatively minute carbon dioxide flow with the much larger argon flow, if it occurs at all, is at best erratic and not precisely controlled within narrow limits as is desirable for the present purpose. The relatively high density of argon is believed to inhibit entry of a minute carbon dioxide flow. A reliable and precisely controlled intermixing of the gas flows is accomplished in this example of the invention by a metering and mixing unit 37 which will be hereinafter described. Hoses 38, 39 and 41 respectively connect the outlets 34 of pressure cylinders 31, 31 and 33 with the metering and mixing unit 37. An additional hose 42 transmits the shielding gas mixture from the outlet fitting 43 of unit 37 to the power supply and wire feeding unit 27 for delivery to welding gun 11 through hose 28.

A primary component of the metering and mixing unit 37 is a mixing valve 44 shown in FIGS. 3 and 4. The mixing valve 44 has a valve body 46 with a gas mixture flow passage 47 that extends from an interior region 48 of the body to a threaded outlet opening 49 at one end of the body. First and second gas inlet passages 51 and 52 extend inward from the opposite end of body 46 and communicate with opposite sides of the mixture flow passage 47 at the interior region 48, the axes of the inlet passages and the axis of the mixture flow passage being co-planar. Inlet passages 51 and 52 are at opposite sides of mixture flow passage 47 and each is oriented at an angle, of 30° in this example, with respect to the mixture flow passage.

A third gas inlet passage 53 in valve body 46 is also angled, at 30° in this example, with respect to mixture flow passage 47 and is located to communicate with the mixture flow passage at a downstream area 54 of the mixture flow passage that is between the interior region 48 and outlet opening 49.

Each inlet passage 51, 52 and 53 has a threaded outer end portion 56 that is of larger diameter than the inner portions 57 of the inlet passages and thus an annular shelf 58 is provided within each inlet passage.

Metering of the argon and helium flows, which respectively enter inlet passages 51 and 52 at similar pressures, is effected by metering jet fittings 59 one of which is seated against the shelf 58 within each such inlet passage.

Referring jointly to FIGS. 5 and 6, each metering jet fitting 59 has a threaded tubular outlet end 61 engaged in the inner portion 57 of the inlet passage and has a head 62 of larger diameter which seats against the shelf 58 of the passage. A tapered opening 63 in the head 62 channels gas to a flow constriction 64 that communicates with a larger diameter outlet passage 66 in the outlet end 61 of the fitting 59. A cross slot 65 in head 62 provides for installation of the fitting 59 with a screwdriver or similar tool.

The flow constrictions 64 of the two metering jet fittings 59 are differently sized to transmit gas at different predetermined flow rates when provided with the same inlet gas pressure. Referring again to FIGS. 3 and 4, the jet fitting 59 in first inlet passage 51 is sized to transmit from about 71% to about 83% of the total gas flow into flow passage 47 and the fitting 59 in the second inlet passage 52 is sized to transmit from about 16% to about 25% of that total gas flow.

The fixed flow constrictions of the metering jet fittings 59 can be manufactured with sufficient precision to provide the desired proportioning of argon and helium flows into the shielding gas mixture. Metering of the smaller carbon dioxide flow within its relatively narrow range of flow limits is accomplished by a needle valve 67 within the third inlet passage 53 in order to enable an initial calibration or adjustment of the carbon dioxide flow to assure that it is of the desired magnitude.

Needle valve 67 has a head 68 which seats against the shelf 58 within third inlet passage 53, a threaded intermediate portion 69 engaged in an adjacent threaded portion of the passage and an outlet end 71 of reduced diameter. Referring now to FIG. 7, a tapered opening 72 in the head 68 channels inlet gas to a flow constriction 73 which communicates with a larger diameter passage 74 that extends through outlet end 71. A needle member 76 extends along the axis of passage 74 and has a pointed tip 77 which enters flow constriction 73. Needle member 76 has a threaded end portion 78 which engages threads in the end region of passage 74 and which is of larger diameter than the rest of he needle member. Needle end portion 78 protrudes from end 71 of the outer valve member and has a transverse slot 79 for receiving a screwdriver tip. Thus rotation of needle member 76 with a screwdriver moves the pointed tip 77 to vary the effective flow aperture of flow constriction 73. The gas flow is released from needle valve 67 through apertures 80 in the sidewall of the outlet end 71.

Referring to FIGS. 4 and 7 in conjunction, the needle valve 67 is adjusted by monitoring gas flow with a flowmeter and turning member 76 until flow rate through the needle valve is from 1% to 4% of the total flow rates of the three gases into the mixing valve 44. It is usually preferable that the needle member 76 then be permanently immobilized relative to the other portions of the needle valve 67 such as by hardening a drop 81 of epoxy adhesive or the like around the protruding end 78 of the needle valve member. This inhibits drift of the valve adjustment from vibration or other causes and also forestalls any attempts to alter the flow rate by operators who may not understand the criticality of the adjustment.

Referring again to FIGS. 3 and 4, several aspects of the mixing valve 44 contribute to realizing a precise and consistent proportioning of the shielding gas flow constituents. The inlet flow constrictions at metering jet fixtures 59 and needle valve 67 cause the pressure within mixture flow passage 47 to be substantially lower than the inlet pressure at the inlet ends of passages 51, 52 and 53. This generates a Venturi effect which aids in drawing the helium flow into the larger flow of relatively dense argon and subsequently, at a downstream point 54, aids in entraining the relatively small flow of carbon dioxide into the mixture. The angling of the three inlet passages 51, 52 and 53 relative to mixture flow passage 47 also contributes to steady inflow and entrainment of the minor constituent gases through a jet pumping effect. Enhanced metering and mixing can be obtained at angles in the range from about 15° to about 45° although angles of around 27.5° provide optimum results.

Referring now to FIG. 8, handling and set up of the apparatus is facilitated by securing the mixing valve 44 to a support pedestal 82 within a protective housing 83 which may be provided with a carrying handle 84. Three gas inlet fittings 86 are mounted in one endwall of housing 83 and are connected to the mixing valve 44 by short lengths of flexible hose 87. A gas mixture outflow pipe 88 extends from the mixing valve 44 through the opposite endwall of the housing 83 and has a fitting 43 at the end. A safety relief valve 91 is communicated with pipe 88 within housing 83 to vent any overpressures which might occur from misadjustment of the gas sources and a flowmeter 92 is mounted on the pipe outside the housing to enable monitoring of flow rate.

Referring again to FIG. 2, the metering and mixing unit 37 is coupled to pressure cylinders 31, 32 and 33 by hoses 38, 39, 41 and to power supply and wire feeding unit 27 by an additional hose 42 in the manner previously described. The outlet valves 34 of each cylinder 31, 32 and 33 are then adjusted to supply the three gases to unit 37 at the same inlet pressure which may be varied to adjust the shielding gas mixture flow rate as may be appropriate to different welding operations.

Tests have shown that arc instabilities appear if the carbon dioxide content of the gas mixture drops below about 1%. Weld oxidation and the other previously discussed problems of the prior art occur if the carbon dioxide content rises above about 4%. Similar problems appear if the helium content is outside the range from about 16% to about 25%. Optimum results have been obtained with a mixture of 3.1% carbon dioxide controlled to be within ±0.1% of that value, 20% helium and 76.9% argon. The metering and mixing unit 37 provides sufficiently precise control of the minor constituents to reliably and repeatably provide the desired gas mixture composition.

The shielding gas composition when mixed on line with precise metering as herein described enables a reduced energy input per unit length of weld bead of the order of one-third to one-half and a substantial increase in metal deposition rate. Little or no mechanical reworking is required as oxidation and surface irregularity is absent or minimal. Heat damage to workpieces is also reduced and the welds exhibit excellent penetration and fusion. Similar results are obtained during out of position welding. Alloy component loss from oxidation or evaporation is minimized or avoided in the welding of such metals as stainless steels, low alloy steels and nickel based alloys.

In one specific example of the practice of the invention, a weld bead was formed at horizontal edges, abutted at right angles, of ¼ inch thick type 304L stainless steel workpieces. The electrode was 0.035 inch diameter type 308L filler wire fed at a rate of 350 inches per minute. Welding travel speed along the bead was 14 inches per minute. Average arc current was 110 amperes with average applied voltage of 23.5 volts. A shielding gas mixture having the hereinbefore described optimum composition of 3.1% carbon dioxide, 20% Helium and 76.9% argon was delivered to the weld region in the manner hereinbefore described at a flow rate of 35 cubic feet per hour. Metal deposition rate was 4.8 pounds per hour. The resulting weld exhibited a smooth 45° fillet with complete fusion at both sides and root penetration of 40 to 60 mils. No oxidation or discoloration was visible and the freeze line pattern was smooth and uniform. The operation was repeated to form a vertical weld bead and then an overhead weld bead, without changing the settings of the welding apparatus, with similar results.

The invention has been described with respect to manual welding operations with a hand held welding gun. The method, apparatus and shielding gas composition are also applicable to automatic welding installations in which the welding gun is supported and traveled by mechanical apparatus.

While the invention has been described with reference to certain specific embodiments for purposes of example, many modifications are possible and it is not intended to limit the invention except as defined in the following claims.

We claim:

1. In a pulsed arc gas metal arc welding method for welding metal workpieces which includes the steps of establishing an electrical arc between said workpieces and a consumable electrode to transfer metal from said electrode to a weld at said workpieces, cyclically varying the intensity of the arc during the welding operation, and directing a shielding gas mixture to the region of said weld during said welding operation, the improvement comprising:

preparing said shielding gas mixture concurrently with said welding operation by merging and intermixing individually metered flows of carbon dioxide, argon and helium while said welding operation is in progress, directing a flow of the argon, helium and carbon dioxide gas mixture to said weld region, metering the helium content of said flow to be within the range from about 16% to about 25% and metering the carbon dioxide content of said flow to be within the range from about 1% to about 4%.

2. The method of claim 1 wherein said shielding gas mixture is directed to said weld region through a flow passage, including the further steps of metering said flows of argon and helium at separate locations and merging and intermixing the metered flows of argon and helium at a first portion of said flow passage and mixing in said carbon dioxide at a downstream portion of said flow passage that is between said first portion thereof and said weld region.

3. The method of claim 2 including the further steps of intermixing said argon and helium by directing convergent flows the hereof together at said first portion of said flow passage, and directing a flow of said carbon dioxide obliquely into said flow passage at said downstream portion thereof.

4. The method of claim 1 including the further steps of utilizing an adjustable flow metering device to direct said carbon dioxide into said argon and helium, adjusting said device to bring said carbon dioxide content of said shielding gas within said range of from about 1% to about 4%, and subsequently rendering said device inadjustable.

5. The method of claim 1 including the further steps of adjusting the current of said electrical arc to a selected value in the range from about 40 to about 350 amperes, and cyclically pulsing said arc current at a frequency having a number of cycles per second that corresponds substantially to the selected number of amperes in said arc current.

6. The method of claim 1 including the further step of regulating the argon content of said flow to be within the range from about 71% to 83%.

7. The method of claim 1 including the step of maintaining the $CO_2$ of said flow within about 0.1% of 3.1%.

8. A shielding gas mixture for use in gas metal pulse arc welding comprising intermixed argon, helium and carbon dioxide, said mixture having a helium content in the range from about 16% to about 25% and having a carbon dioxide content in the range from about 1% to about 4%, the balance of said shielding gas mixture being argon.

9. The shielding gas mixture of claim 8 wherein the helium content of said mixture is about 20%, the carbon dioxide content of said mixture is about 3.1% and the argon content of said mixture is about 76.9%.

10. In gas metal pulse arc welding apparatus having a welding gun for supporting a consumable electrode in spaced apart relationship with a workpiece at which a weld is to be formed, a pulsed electrical current source having means for establishing and maintaining a pulsed electrical arc between said electrode and said workpiece, and having means for directing a shielding gas flow to the region of said weld, the improvement comprising:

a mixing valve having a gas mixture flow passage with an outlet end communicated with said means for directing a shielding gas flow to said region of said weld, said mixing valve having a plurality of separate gas inlet passages each extending in convergent angled relationship to said mixture flow passage and connecting therewith, a plurality of flow metering flow constrictions each being disposed in a separate one of said plural inlet passages of said mixing valve, and a plurality of gas containers and means for separately communicating each of said inlet passages of said valve with a separate one of said gas containers.

11. The welding apparatus of claim 10 wherein each of said inlet passages is angled with respect to said gas mixture flow passage at an angle within the range from about 15° to about 45°.

12. The welding apparatus of claim 10 wherein a first and a second of said gas inlet passages are oppositely angled with respect to said gas mixture flow passage and communicate with said gas mixture flow passage at opposite sides of a predetermined portion thereof.

13. The welding apparatus of claim 12 wherein said flow constrictions in said first and second of said gas inlet passages have flow orifices aligned along convergent axes that intersect at said predetermined portion of said gas mixture flow passage.

14. The welding apparatus of claim 12 wherein a third of said gas inlet passages connects with said gas mixture flow passage within said mixing valve at a location in said gas mixture flow passage which is between said outlet end and said predetermined portion thereof, and wherein said flow metering constriction within said third gas inlet passage of said mixing valve includes means for limiting inflow through said third gas inlet passage to the range from about 1% to about 4% of the total inflow of gas into said mixing valve.

15. The welding apparatus of claim 12 wherein a third of said gas inlet passages connects with said gas mixture flow passage within said mixing valve at a location along said gas mixture flow passage which is between said outlet end and said predetermined portion thereof, and wherein said flow metering flow constriction in said third gas inlet passage includes means for adjusting the size of the flow passage therethrough, and means for preventing further adjustment of said flow passage size after a selected preceding adjustment thereof.

16. A mixing valve for supplying a shielding gas mixture to the weld region during arc welding operations, comprising:

a valve body having a gas mixture flow passage communicating with a gas mixture outlet, said valve body having first and second gas inlet passages which are angled with respect to said gas mixture flow passage and which connect therewith at opposite sides of a predetermined portion thereof, said valve body having a third gas inlet passage which is angled with respect to said gas mixture flow passage and which connects therewith at a location between said outlet and said predetermined portion thereof, first, second and third flow constrictions in said first second and third gas inlet passages respectively, said flow constrictions being situated within said valve body, said first and second flow constrictions being sized to produce an abrupt pressure drop in the gas flowing from said first and second gas inlet passages into said mixture flow passage, and wherein said third flow constriction is sized to admit a gas flow into said mixture flow passage from said third gas inlet passage that is smaller than the gas flows through said first and second flow constrictions, and means for connecting each of said first, second and third gas inlet passages to a separate gas source.

17. The mixing valve of claim 16 wherein each of said first, second and third gas inlet passage intersects said gas mixture flow passage at an angle in the range from about 15° to about 45°.

18. The mixing valve of claim 16 wherein said first and second flow constrictions are positioned to direct colliding jets of gas into said predetermined portion of said gas mixture flow passage from opposite sides thereof.

19. The mixing valve of claim 16 wherein said third flow constriction includes means for adjusting the size of the flow aperture therethrough, and means for preventing further adjustment of said flow aperture after an initial adjustment thereof.

20. The mixing valve of claim 16 wherein said third flow constriction is formed by a needle valve.

21. A mixing valve for supplying a shielding gas mixture to the weld region during pulsed arc gas metal arc welding, comprising:

a valve body having an outlet and an internal gas mixture passage extending thereto, first and second gas inlet passages within said valve body communicating with a predetermined portion of said gas mixture passage from opposite sides thereof, said first and second gas inlet passages each being acutely angled with respect to said gas mixture passage and being co-planar therewith, said valve body further having a third gas inlet passage which is also acutely angled with respect to said gas mixture passage and which communicates therewith at a downstream location between said outlet and said predetermined portion of said gas mixture passage, first and second flow constriction fittings disposed in said first and second gas inlet passages respectively within said valve body, said first and second flow constriction fittings being oriented to direct gas flows into said predetermined portion of said gas mixture flow passage for intermixing thereat, said first and second flow constrictions being sized to produce an abrupt pressure drop in the gas flowing from said first and second gas inlet passages into said gas mixture passage, and wherein said third flow constriction is sized to admit a gas flow into said gas mixture passage that is smaller than the gas flows through said first and second flow constrictions, a needle valve disposed in said third gas inlet passage, and means for communicating each of said gas inlet passages with separate gas sources.

* * * * *